Nov. 29, 1927.

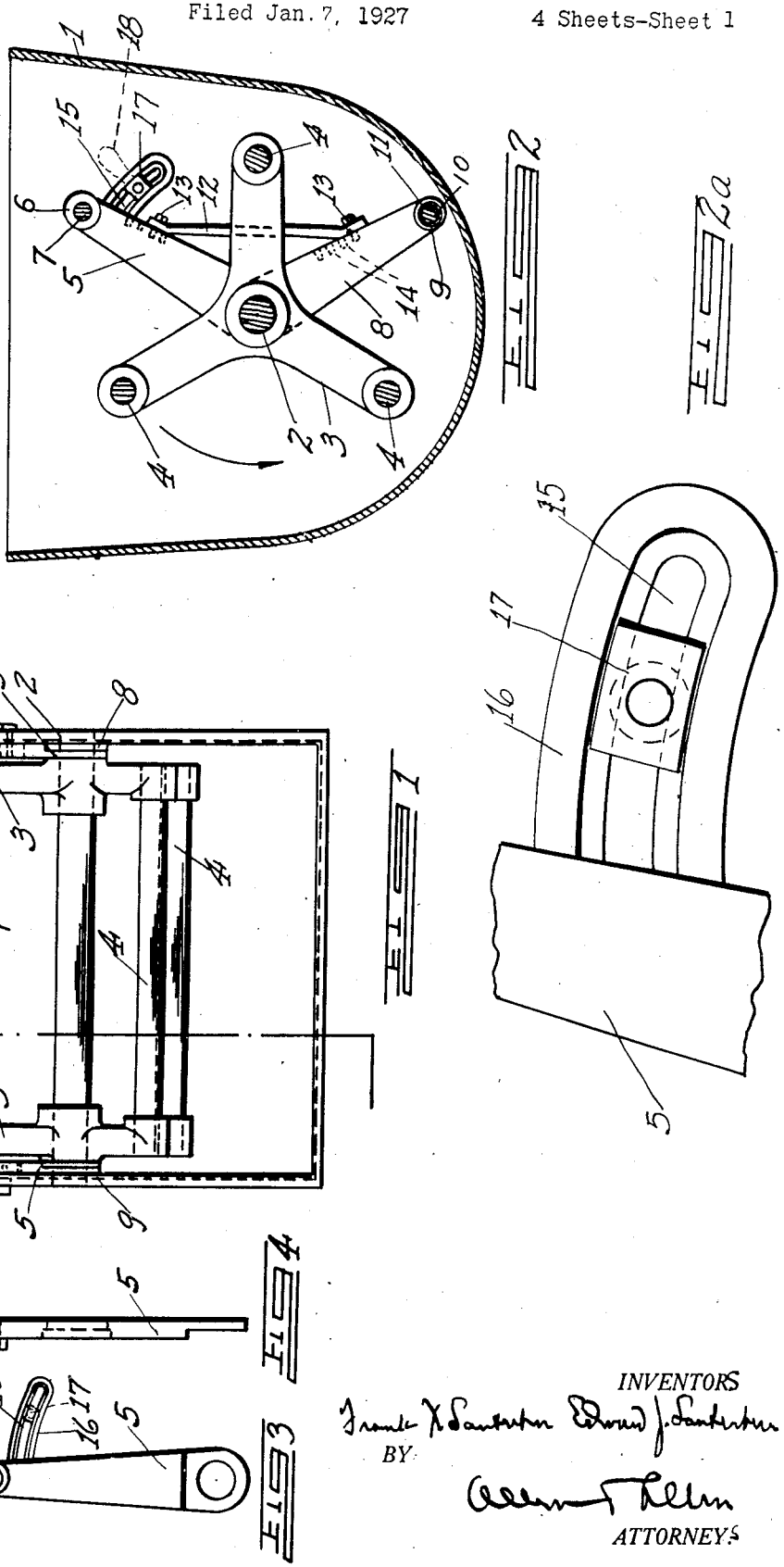

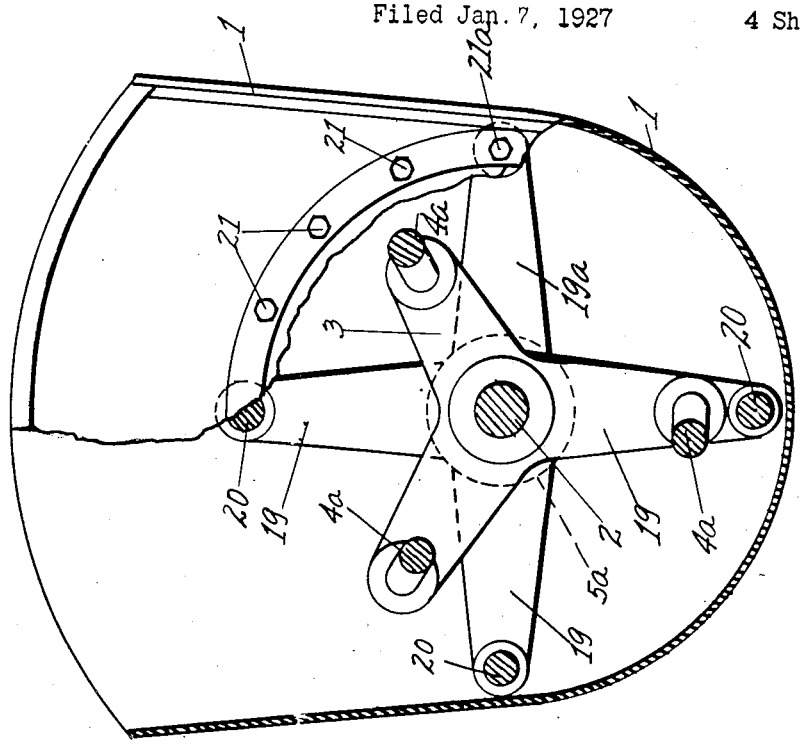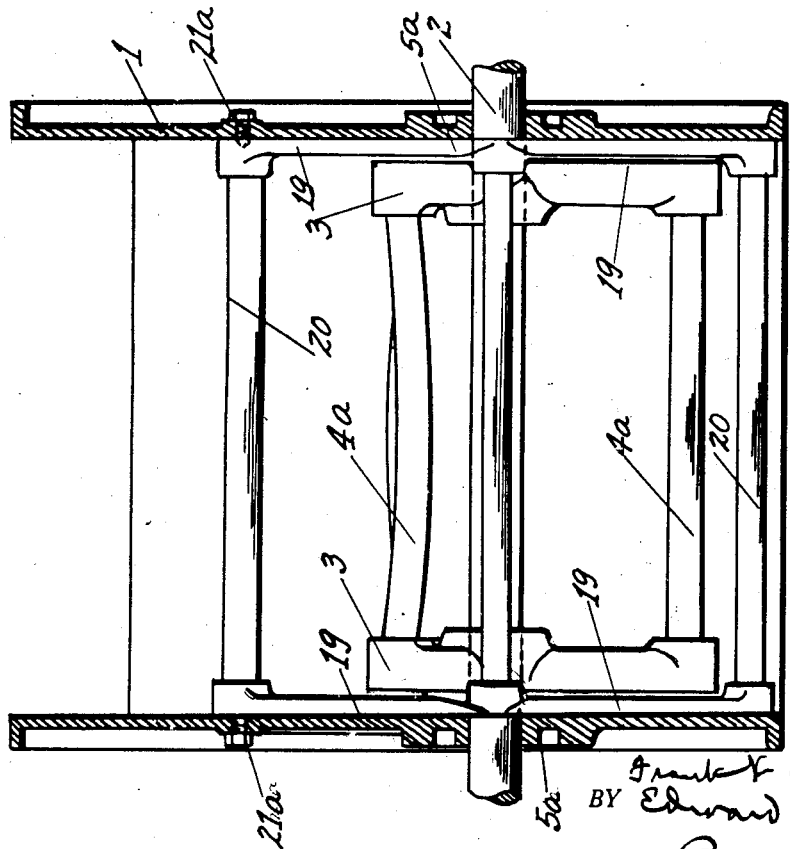

F. X. LAUTERBUR ET AL 1,651,092

DOUGH MIXING AND CONDITIONING MACHINE

Filed Jan. 7, 1927  4 Sheets-Sheet 3

INVENTORS
Frank X. Lauterbur
Edward F. Lauterbur
BY
ATTORNEYS

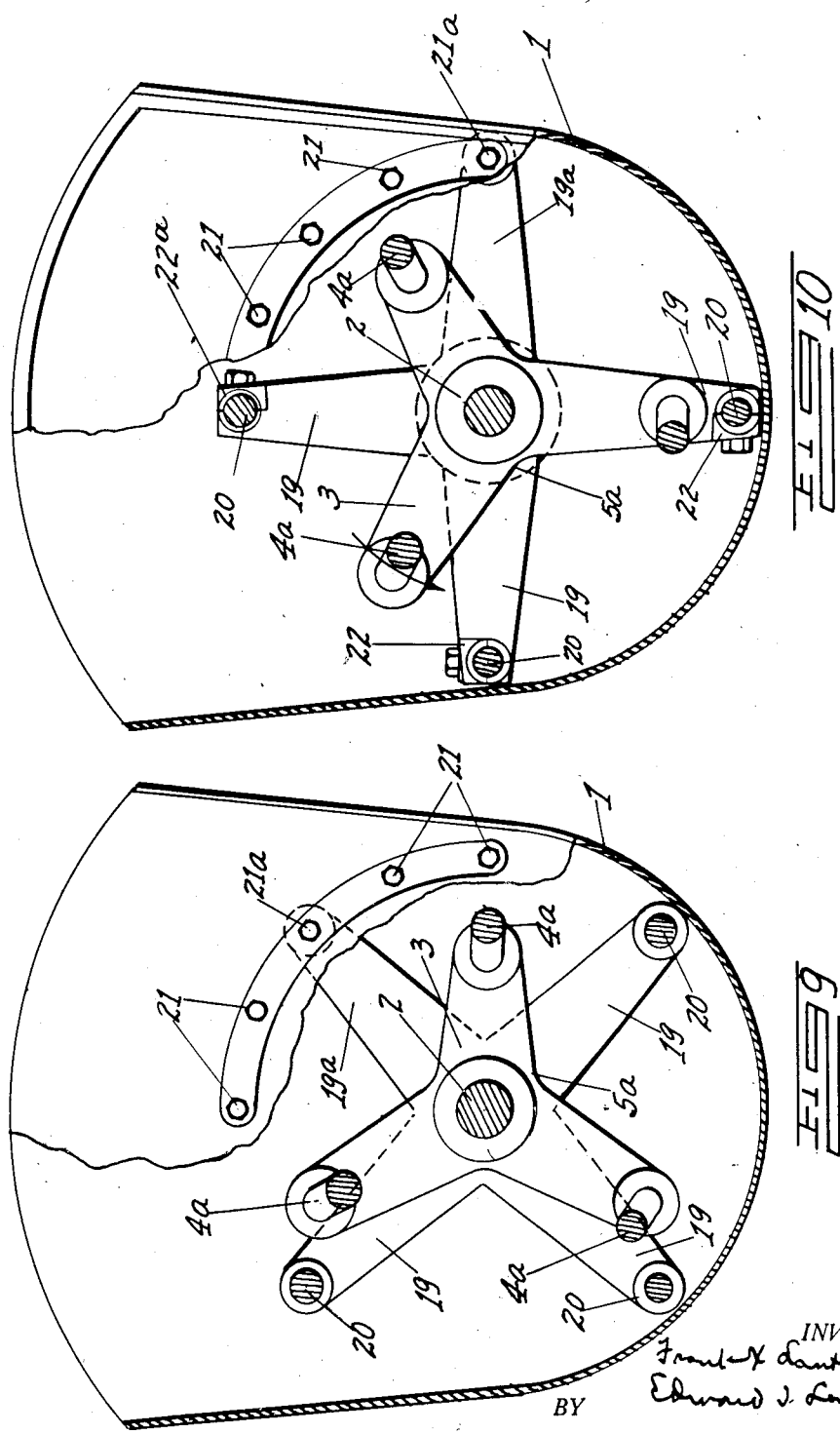

Patented Nov. 29, 1927.

1,651,092

UNITED STATES PATENT OFFICE.

FRANK X. LAUTERBUR AND EDWARD J. LAUTERBUR, OF SIDNEY, OHIO.

DOUGH MIXING AND CONDITIONING MACHINE.

Application filed January 7, 1927. Serial No. 159,682.

Our invention relates to dough mixing machines, and particularly to improvements in retarding and stretching devices in dough mixers adapted to co-operate with the mixer agitators.

It is the object of our invention to provide stretching and retarding rollers for a dough mixer having a horizontally rotatable agitator which rollers have a co-operative relationship with the ingredients, and to so arrange the rollers that adjustment of the position of one roller may control the position of another.

In our co-pending application Serial No. 151,802, filed November 30, 1926, we have described a novel process for mixing dough. In accordance with this process we have found a desirable arrangement of devices to co-operate with a mechanical agitator in a mixer, to be at least one roller disposed above the level of the agitator shaft in the upper part of the bowl, and another roller disposed below the level of the agitator in the lower part of the bowl. These rollers may be rotatably mounted and it is a particular object of our invention to provide an adjustable mounting for the rollers which will give an operator a unit control for positioning the rollers with relation to the agitator.

In mixing dough we have found that although for a given batch of dough the desirable position for a roller in the upper part of the bowl, and of a roller in the lower part of the bowl, may usually be accurately determined, for various different mixes and combinations the predetermined positions for the rollers are not always satisfactory. Further I have found that it is often desirable to change the position of the upper and lower rollers during the mixing process.

The purpose of rollers above the axis of rotation is to break the projection of a dough mass against a bowl wall, to retard its centrifugal throw and to guide it downwardly. The purpose of the rollers below the axis of rotation is for retarding and stretching the dough mass. It is desirable to have the rollers or bars within the bowl retard and stretch the dough without causing division of the mass.

With such arrangements as will be hereinafter described, the gluten in a dough mix may be properly developed without overheating the mix and the operation may be carried out in a short time with a comparatively high rate of speed of the agitator.

In the drawings in which we have illustrated several preferred embodiments of our invention:—

Figure 1 is a plan view of a mixer equipped with one upper and one lower roller.

Figure 2 is a section along the lines 2—2 in Figure 1.

Figure 2$^a$ is a detail of the adjustment bracket.

Figure 3 is a front elevation of one of the roller supports shown in Figure 1.

Figure 4 is a side elevation of the roller support shown in Figure 3.

Figure 5 is a section of a different type of mixer having a different arrangement of agitator bars, and having a three bar or roller retarding unit.

Figure 6 is an end elevation with portions of the bowl wall cut away to show the inner bowl structure.

Figure 7:
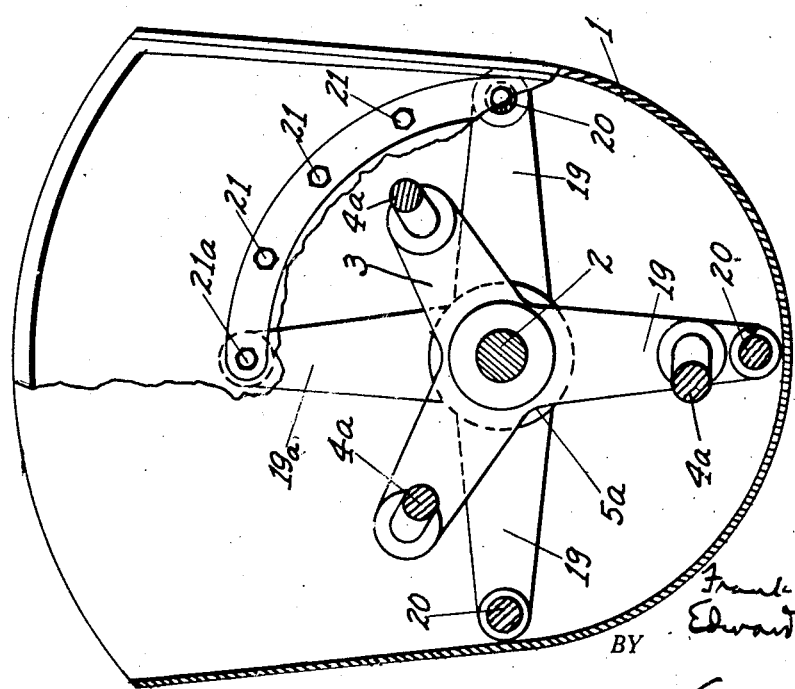

Figure 7 is an end view of the arrangement shown in Figure 5, with the arm 19$^a$ in locked engagement.

Figure 8:
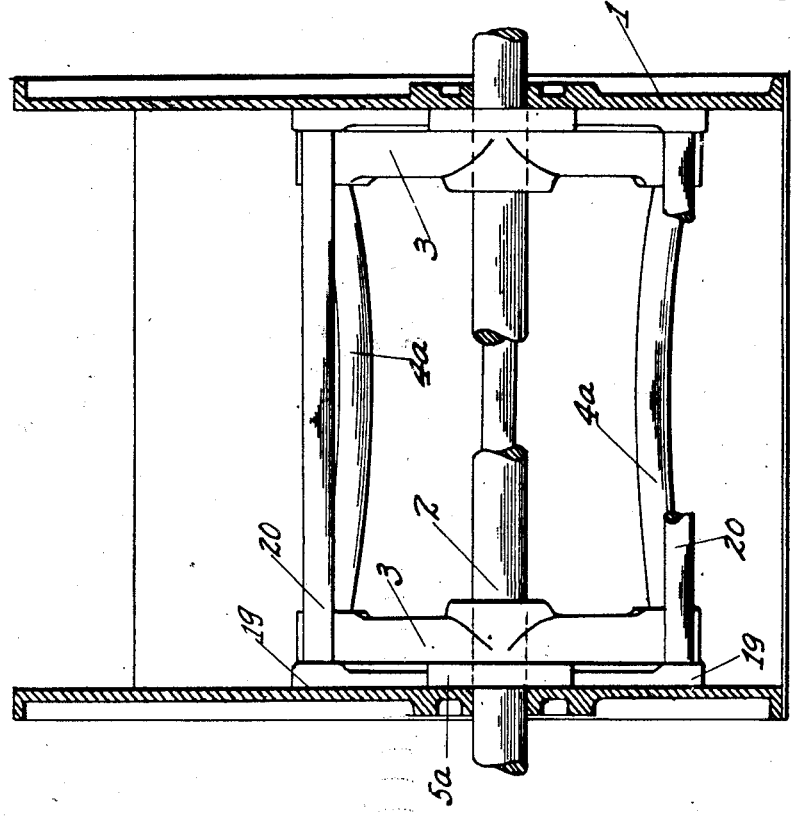

Figure 8 is a sectional view of the arrangement shown in Figure 9.

Figure 9 is an end elevation with parts cut away showing the same type of agitator shown in Figures 5–8 with the adjustment differently arranged.

Figure 10 is an end view showing the parts in a different adjusted position, and showing a different construction which permits the use of either fixed bars or rotatable sleeves with the spider arm supports.

Referring first to Figures 1–4, we have generally indicated at 1 the mixing bowl, in this instance a U-shaped tank. A shaft 2 is suitably journaled in and extends through the tank carrying the spiders 3 at each end of the bowl. From the spiders 3 the agitator bars 4 extend lengthwise across the bowl. A drive which is not shown, as it forms no part of my invention, is provided for rotating the shaft. The agitator bars are preferably carried around in a counter-clockwise direction as shown in Figure 2 for mixing the dough.

Pivotally mounted about the shaft 2 and extending diagonally upward in each of the ends of the bowl are the upper roller supports 5. The supports have bosses 6, and extending across between the bosses 6 the roller 7 is preferably rotatably mounted. Extending downwardly and also preferably pivotally mounted about the shaft 2 are the lower roller supports 8 having bosses 9 and a roller 10 extending across between the bosses. The lower roller is shown with a sleeve 11 rotatably mounted thereon. Between the end edges of the supports 5 and 8 at each end of the bowl, an adjustment bar 12 is extended. In some types of mixers this bar may be a fixed brace or it may be adjustably mounted so that the relative position of the supports 5 and 9 may be controlled. I have found it preferable, however, to provide an adjustable connection which may be provided by having studs or set screws 13 connecting the bar 12 to the supports 5 and 9, and providing a series of threaded holes 14 in the end edges of the supports inclined at such angles as will properly seat the stud bolts in order to give different angles of adjustment between the supports 5 and 9. A bracket 16 having a countersunk groove 15 is attached to each support 5, and a slidable nut 17 is mounted in the countersunk groove. Wing bolts 18 extend through the bowl wall and are threaded within the nuts 17. By loosening the wing bolts exteriorly of the bowl wall the brackets will thus slide to a desired position at which the wing bolts may be tightened and the supports thus fixed in a desired position.

In the modifications in Figures 5–10 which show more practical assemblies from a manufacturing point of view we have shown the same type of U-shaped bowl 1, with a shaft 2 carrying spiders 3. The spiders 3 have curved bars or rollers 4ª which are shown in the preferred arrangement which is described in our co-pending application Serial No. 131,478 of August 25, 1926. The retarding roller or bar supports are in these modifications provided by spiders 5ª which have a set of four arms 19 which may be used for supporting the dough retarding elements. The spiders carry three rollers or bars 20, the arm without a bar being provided for controlling the unit adjustment for controlling the position of the spider assembly. The adjustment elements in these modifications are shown as cap screws 21 which extend through the bowl wall and which may fit into threaded or countersunk holes in the spider arms 19ª which we have so indicated to distinguish them from the arms 19 which carry the retarding rollers except in Figure 5. The cap screw will hold the spider, however, merely by frictional engagement which avoids the necessity of matching holes. It will be noted that the bowl wall has an arrangement of threaded holes with cap screws therein in an arcuate formation extending through an arc of approximately ninety degrees. This enables the positioning of the rollers in practically every conceivable position. In Figure 5 we have shown the lock stud secured in the arm 19 at the top of the arcuate arrangement. In Figure 6 we have shown the lock stud secured in the arm 19ª at the bottom of the arcuate arrangement. In Figure 7 the arrangement is the same as in Figure 5, excepting that arm 19ª is at the top of the arc. Figures 8 and 9, the cap screw is shown holding the spiders in the middle of the arcuate arrangement. Figure 10 shows the same arrangement of retarding bars as is shown in Figure 6, but it should be noted that the spider arms have removably mounted circular bearing blocks 22 which will allow the bars 20 to be removed and sleeves 22ª to be inserted over them. In this type of structure it is advisable to mount the circular bearing blocks in opposition to the throw of material to be agitated. Thus in the arrangement shown in Figure 10 the direction of rotation of the agitator is indicated by the arrow and is from the end shown, counterclockwise. Thus the throw of dough will tend to keep the retarding bars in fixed position without exerting a strain which would tend to loosen them in their bearings.

The cap screws may be all of the same length, or there may be a master cap screw 21ª which is used to lock the spider arms. If there is a master cap screw, the cap screw is loosened and the retarding bars moved to a predetermined position. The plain cap screw 21 in the desired hole is then removed, and the master cap screw inserted to hold the spider. The plain cap screw is then inserted in the hole formerly occupied by the master cap screw.

While we have shown constructions which will lend themselves to many mechanical adaptations, as far as we are aware, no one has previously provided retarding rollers or bars with a co-operative connection between them, so that the position of one may be determined with relation to another. We claim the same broadly therefore. It will also be within the scope of our invention to have the rollers in different numbered series. As long as the unitary adjustment plan is used, it is thought that such modifications will come within the scope of our invention.

Having thus described our invention what we claim as new and desire to secure by Letters Patent is:—

1. In a dough mixer having a horizontally rotatable agitator on a shaft, and a bowl within which said agitator is mounted, a member extending substantially in alignment with said agitator shaft for deflecting the centrifugal throw of a dough mass against side walls of the bowl, and a member extending substantially in alignment with said agitator shaft for deflecting the downward throw of a dough mass against the bottom walls of the bowl, and means for mounting said members, said means having a co-operative adjustability.

2. In a dough mixer having a horizontally rotatable agitator on a shaft, and a bowl within which said agitator is mounted, a member extending substantially in alignment with said agitator shaft for deflecting the centrifugal throw of a dough mass against side walls of the bowl, and a member extending substantially in alignment with said agitator shaft for deflecting the downward throw of a dough mass against the bottom walls of the bowl, and means for mounting said members, said means having a co-operative adjustability, said means for mounting said members comprising axial supports for said members.

3. In a dough mixer having a horizontally rotatable agitator on a shaft, and a bowl within which said agitator is mounted, a member extending substantially in alignment with said agitator shaft for deflecting the centrifugal throw of a dough mass against side walls of the bowl, and a member extending substantially in alignment with said agitator shaft for deflecting the downward throw of a dough mass against the bottom walls of the bowl, and means for mounting said members, said means having a co-operative adjustability, said means for mounting said members comprising axial supports for said members, and said co-operative adjustable means extending to the outside of the bowl, whereby adjustment of said members may be made exteriorly of the bowl.

4. In a dough mixer having a horizontally rotatable agitator, a shaft on which said agitator is mounted, and a bowl through which said agitator shaft extends, at least one dough deflecting element extending across the bowl above said agitator shaft, at least one deflecting element extending across the bowl below said agitator shaft, and interconnecting means between said elements.

5. In a dough mixer having a horizontally rotatable agitator, a shaft on which said agitator is mounted, and a bowl through which said agitator shaft extends, at least one dough deflecting element extending across the bowl above said agitator shaft, and at least one dough deflecting element extending across the bowl below said agitator shaft, and interconnecting means between said elements, said elements having an adjustable mounting.

6. In a dough mixer having a horizontally rotatable agitator, a shaft on which said agitator is mounted, and a bowl through which said agitator shaft extends, at least one dough deflecting element extending across the bowl above said agitator shaft, and at least one dough deflecting element extending across the bowl below said agitator shaft, and interconnecting means between said elements, said elements having adjustable mounting means adjustable exteriorly of the bowl.

7. In a dough mixer having an agitator with a horizontal axis of rotation, means for deflecting dough above the axis of rotation, and means for deflecting dough below said axis of rotation, and a unitary mounting for said deflecting means.

8. In a dough mixer having an agitator with a horizontal axis of rotation, means for deflecting dough above the axis of rotation, and means for deflecting dough below said axis of rotation, and a unitary mounting for said deflecting means, said unitary mounting means adjustable for supporting non-rotatable and rotatable deflecting means.

9. In a dough mixer, an agitator, a bowl within which said agitator is adapted to rotate, means for retarding the centrifugal throw of a dough mass against side walls of the bowl, and means for retarding the downward throw of a dough mass, and means for adjusting the relative position of said retarding means with relation to said axis of rotation.

10. In a dough mixer, an agitator, a bowl within which said agitator is adapted to rotate, and said agitator having a horizontal axis of rotation, a plurality of deflecting means disposed about the axis of rotation within the bowl for retarding the throw of a dough mass against walls of the bowl, and means for varying the position of said deflecting means.

11. In a dough mixer, an agitator, a bowl within which said agitator is adapted to rotate, and said agitator having a horizontal axis of rotation, a plurality of deflecting means disposed about the axis of rotation within the bowl for retarding the throw of a dough mass against walls of the bowl, and means for varying the position of said deflecting means simultaneously.

12. In a dough mixer, an agitator, a bowl within which said agitator is adapted to rotate, and said agitator having a horizontal axis of rotation, a plurality of deflecting means disposed about the axis of rotation within the bowl for retarding the throw of a dough mass against walls of the bowl, and means for varying the position of said deflecting means from without the bowl.

13. In a dough mixer, an agitator, a bowl within which said agitator is adapted to rotate, and said agitator having a horizontal axis of rotation, a plurality of deflecting means disposed about the axis of rotation within the bowl for retarding the throw of a dough mass against walls of the bowl, and means for varying the position of said deflecting means, and means for supporting said deflecting means coaxially with said axis of rotation.

14. In a dough mixer, an agitator, a bowl within which said agitator is adapted to rotate, and said agitator having a horizontal axis of rotation, a plurality of deflecting means disposed about the axis of rotation within the bowl for retarding the throw of a dough mass against walls of the bowl, and means for varying the position of said deflecting means, and means for supporting said deflecting means coaxially with said axis of rotation, said means for supporting said deflecting means coaxially with said axis of rotation provided with removable supports for said deflecting means.

FRANK X. LAUTERBUR.
EDWARD J. LAUTERBUR.